US011678343B2

United States Patent
Agrawal et al.

(10) Patent No.: US 11,678,343 B2
(45) Date of Patent: Jun. 13, 2023

(54) TRANSPORT BLOCK SIZE DETERMINATION FOR RETRANSMISSION

(71) Applicant: QUALCOMM Incorporated, San Diego, CA (US)

(72) Inventors: Ankit Agrawal, Hyderabad (IN); Sriram Parthasarathy Mannar, Hyderabad (IN); Mahender Reddy Akkapally, Hyderabad (IN); Sameer Pradip Thakre, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/302,624

(22) Filed: May 7, 2021

(65) Prior Publication Data

US 2022/0361226 A1 Nov. 10, 2022

(51) Int. Cl.
*H04W 72/23* (2023.01)
*H04L 1/1812* (2023.01)
*H04W 72/0446* (2023.01)
*H04W 88/02* (2009.01)

(52) U.S. Cl.
CPC .......... *H04W 72/23* (2023.01); *H04L 1/1812* (2013.01); *H04W 72/0446* (2013.01); *H04W 88/02* (2013.01)

(58) Field of Classification Search
CPC ............. H04W 72/14; H04W 72/0446; H04W 72/1289; H04W 88/02; H04L 1/1812
See application file for complete search history.

(56) References Cited

U.S. PATENT DOCUMENTS

| 2010/0056079 A1 | 3/2010 | Onggosanusi et al. |
| 2019/0140783 A1 | 5/2019 | Yerramalli et al. |
| 2019/0222360 A1 | 7/2019 | Nam et al. |

FOREIGN PATENT DOCUMENTS

| KR | 20170118820 A | * 10/2017 |
| WO | 2020019125 | 1/2020 |
| WO | WO-2020019125 A1 | * 1/2020 |

OTHER PUBLICATIONS

International Search Report and Written Opinion—PCT/US2022/071468—ISA/EPO—dated Jul. 26, 2022.

* cited by examiner

*Primary Examiner* — Zhensheng Zhang
(74) *Attorney, Agent, or Firm* — Harrity & Harrity LLP

(57) ABSTRACT

Various aspects of the present disclosure generally relate to wireless communication. In some aspects, a user equipment (UE) may receive a grant indicating a modulation and coding scheme (MCS) that indicates that the grant is for a retransmission of an initial communication. The UE may decode, based at least in part on the grant indicating the MCS that indicates that the grant is for the retransmission and using a transport block size (TBS) of a prior communication, a communication scheduled by the grant, wherein the prior communication is prior to the initial communication. Numerous other aspects are described.

30 Claims, 7 Drawing Sheets

TRANSPORT BLOCK SIZE DETERMINATION FOR RETRANSMISSION

FIELD OF THE DISCLOSURE

Aspects of the present disclosure generally relate to wireless communication and to techniques and apparatuses for transport block size determination for retransmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a grant indicating a modulation and coding scheme (MCS) that indicates that the grant is for a retransmission of an initial communication; and decoding, based at least in part on the grant indicating the MCS that indicates that the grant is for the retransmission and using a transport block size (TBS) of a prior communication, a communication scheduled by the grant, wherein the prior communication is prior to the initial communication.

In some aspects, a UE for wireless communication includes a memory; and one or more processors, coupled to the memory, configured to receive a grant indicating an MCS that indicates that the grant is for a retransmission of an initial communication; and decode, based at least in part on the grant indicating the MCS that indicates that the grant is for the retransmission and using a TBS of a prior communication, a communication scheduled by the grant, wherein the prior communication is prior to the initial communication.

In some aspects, a non-transitory computer-readable medium storing a set of instructions for wireless communication includes one or more instructions that, when executed by one or more processors of a UE, cause the UE to receive a grant indicating an MCS that indicates that the grant is for a retransmission of an initial communication; and decode, based at least in part on the grant indicating the MCS that indicates that the grant is for the retransmission and using a TBS of a prior communication, a communication scheduled by the grant, wherein the prior communication is prior to the initial communication.

In some aspects, an apparatus for wireless communication includes means for receiving a grant indicating an MCS that indicates that the grant is for a retransmission of an initial communication; and means for decoding, based at least in part on the grant indicating the MCS that indicates that the grant is for the retransmission and using a TBS of a prior communication, a communication scheduled by the grant, wherein the prior communication is prior to the initial communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
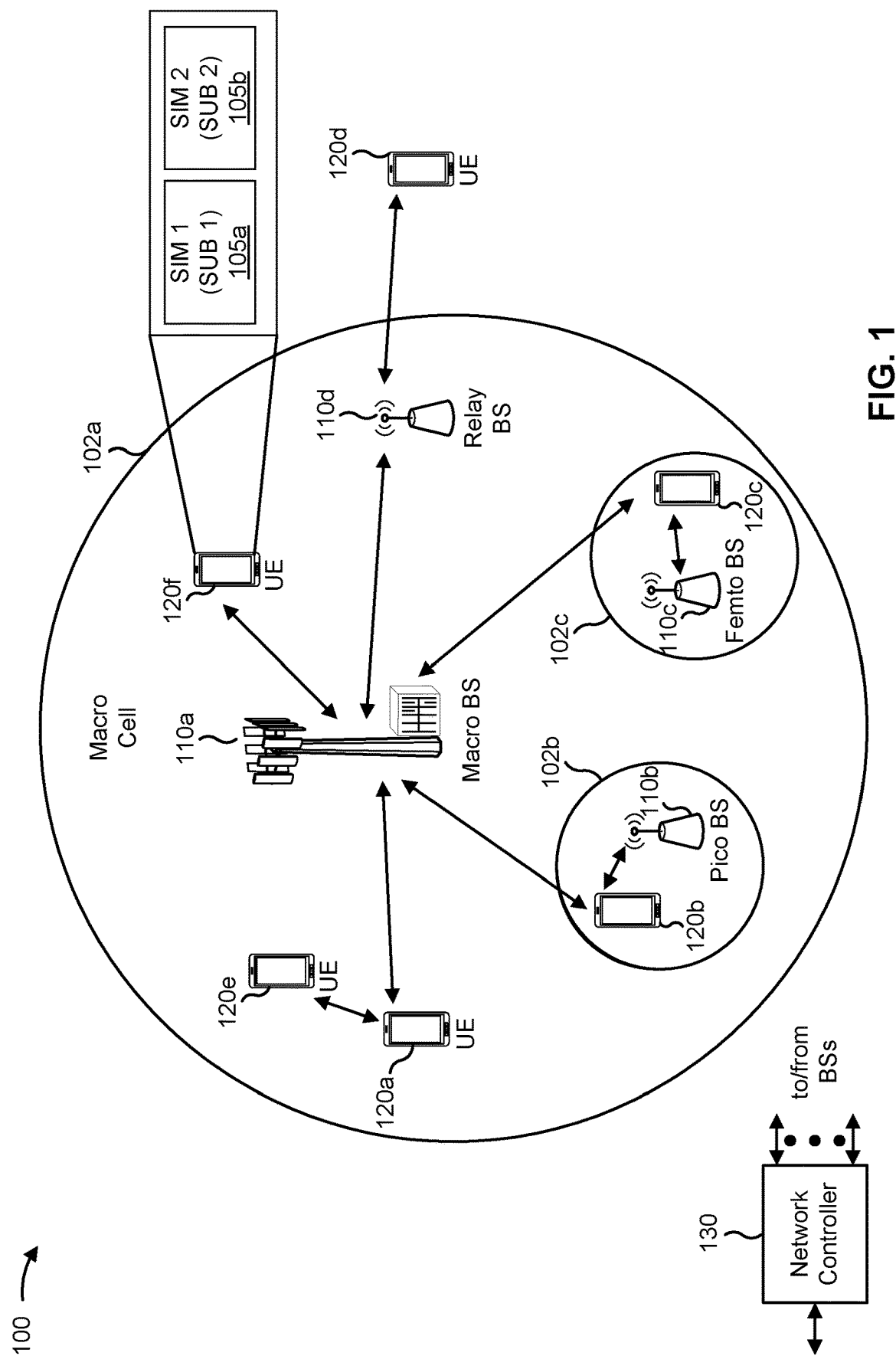
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120f) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

In some aspects, one or more UEs 120 (e.g., shown as UE 120f) may be a multiple subscriber identity module (multi-SIM or MSIM) UE. For example, the multi-SIM UE 120 may include multiple SIMS (e.g., shown as a first SIM 105a and a second SIM 105b). The first SIM 105a may be associated with a first subscription or subscriber (shown as SUB 1), and the second SIM 105b may be associated with a second subscription or subscriber (shown as SUB 2). A subscription may be a subscription with a network operator (for example, a mobile network operator (MNO)) that enables the UE 120 to access a wireless network (for example, a radio access network (RAN)) associated with the network operator. "Subscriber" is used interchangeably with "subscription" herein. The multi-SIM UE 120 may utilize the first SIM 105a and/or the second SIM 105b to communicate with a base station 110, as described in greater detail below with respect to FIGS. 3-5.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
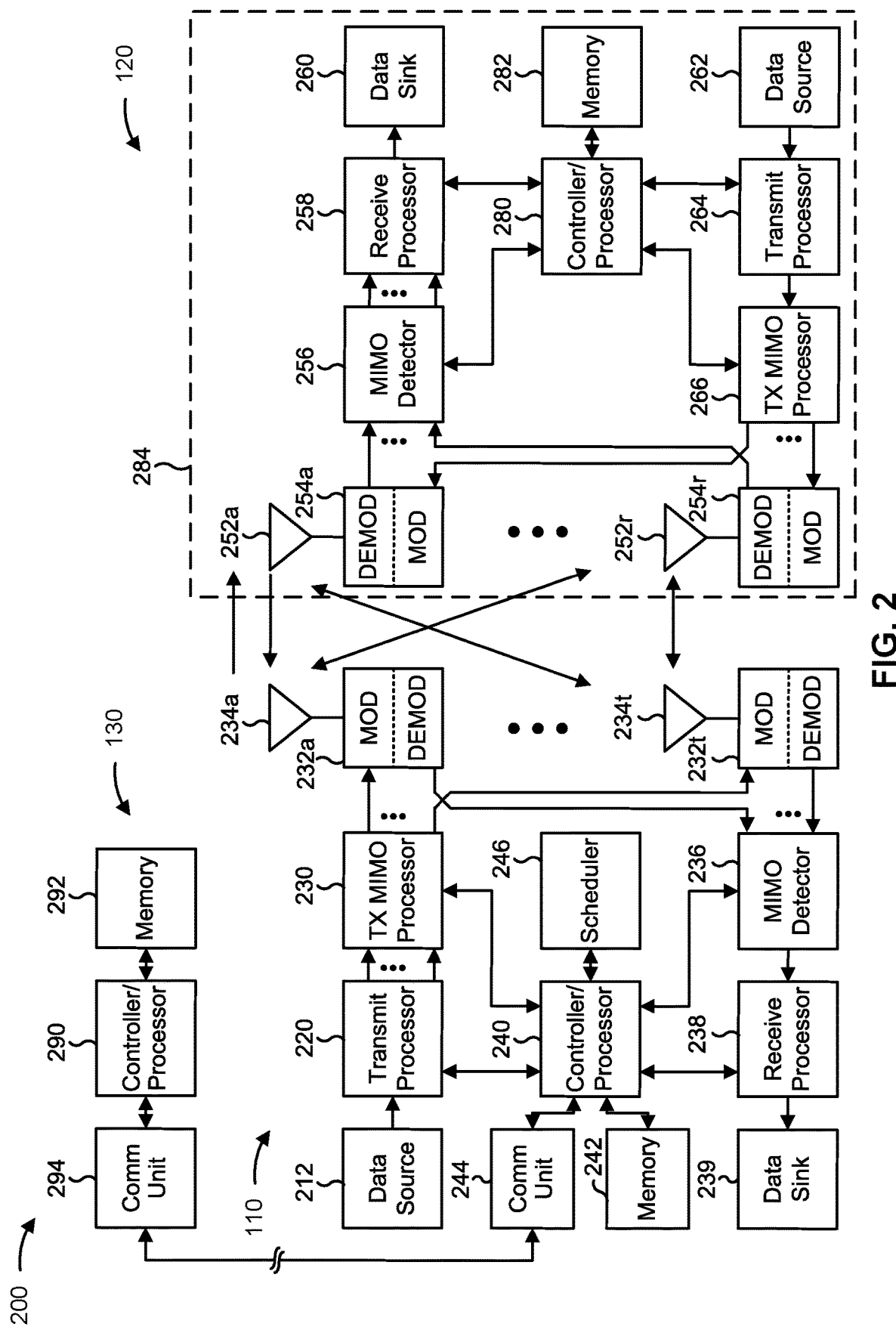
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with determining a transport block size for a retransmission of a grant, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, the UE 120 includes means for receiving a grant indicating a modulation and coding scheme (MCS) that indicates that the grant is for a retransmission of an initial communication; and/or means for decoding, based at least in part on the grant indicating the MCS that indicates that the grant is for the retransmission and using a transport block size (TBS) of a prior communication, a communication scheduled by the grant, wherein the prior communication is prior to the initial communication. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
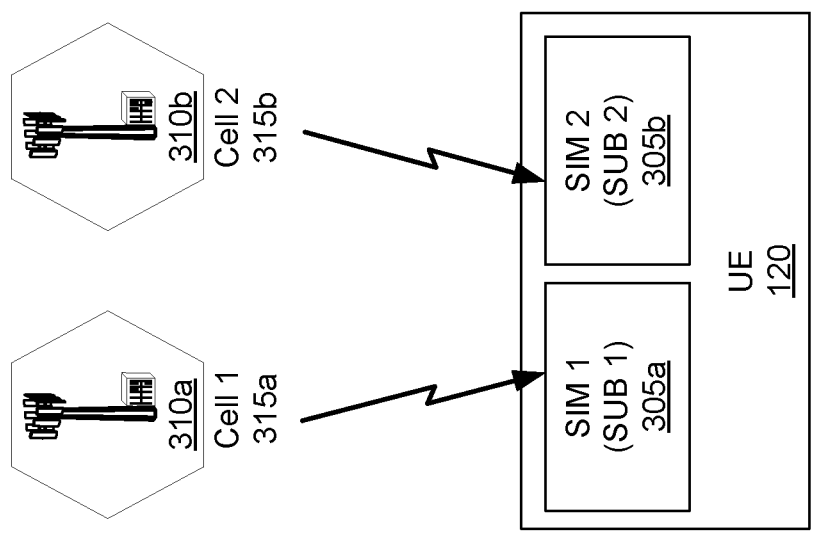
FIG. 3 is a diagram illustrating an example of a multiple subscriber identity module (multi-SIM) UE, in accordance with the present disclosure.

FIG. 3 is a diagram illustrating an example 300 of a multiple subscriber identity module (multi-SIM) UE, in accordance with the present disclosure. As shown in FIG. 3, a UE 120 may be multi-SIM UE that includes multiple SIMs (two or more SIMs), shown as a first SIM 305*a* and a second SIM 305*b*. The first SIM 305*a* may be associated with a first subscription (shown as SUB 1), and the second SIM 305*b* may be associated with a second subscription (shown as SUB 2). A subscription may be a subscription with a network operator (for example, a mobile network operator (MNO)) that enables the UE 120 to access a wireless network (for example, a radio access network (RAN)) associated with the network operator.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service or a voice service, among other examples.

As further shown in FIG. 3, the UE 120 may communicate (for example, in a connected mode, an idle mode, or an inactive mode) with a first base station 310*a* via a first cell 315*a* (shown as Cell 1) using the first SIM 305*a*. In this case, a first subscription (SUB 1) of the UE 120 may be used to access the first cell 315*a* (for example, using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310*b* via a second cell 315*b* (shown as Cell 2) using the second SIM 305*b*. In this case, a second subscription (SUB 2) of the UE 120 may be used to access the second cell 315*b* (for example, using a second IMSI for UE identification, using a second security key for UE authentication, using a second list of services that the UE 120 is permitted to access using the second subscription, or by counting data or voice usage on the second cell against the second subscription, among other examples).

The first base station 310*a* and/or the second base station 310*b* may include one or more of the base stations 110 described above in connection with FIG. 1. Although the first cell 315*a* and the second cell 315*b* are shown as being provided by different base stations, in some aspects, the first cell 315 and the second cell 315*b* may be provided by the same base station. Thus, in some aspects, the first base station 310*a* and the second base station 310*b* may be integrated into a single base station or may be a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (MSMA) mode, such as a dual SIM dual active (DSDA) mode (e.g., when the UE 120 is associated with two subscriptions).

In a DSDA mode, the UE 120 is capable of concurrent active communication using both SIMS of the UE 120. Thus, a UE 120 in the DSDA mode is capable of communicating using the first SIM 305*a* (and the first subscription) at the same time as communicating using the second SIM 305*b* (and the second subscription). For example, when the UE 120 is in an active session (e.g., a voice call or another latency sensitive service, such as online gaming, stock trading, or an over-the-top (OTT) service) using the first SIM 305*a*, the UE 120 is capable of receiving a notification of a voice call using the second SIM 305*b* without interrupting communications that use the first SIM 305*a*, and without tuning or switching away from the first cell 315*a* to tune to the second cell 315*b*. In some aspects, the UE is capable of performing the voice call (or another communication) using the second SIM 305*b* while the active session using the first SIM 305*a* is ongoing.

In a DSDS mode, the UE 120 is not capable of concurrent active communication using both SIMS of the UE 120. Thus, a UE 120 in the DSDS mode is not capable of communicating using the first SIM 305*a* (and the first subscription) at the same time as communicating using the second SIM 305*b* (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs, and may not be capable of operating in a DSDA mode for a second combination of RATs. For example, the UE 120 may be capable of operating in a DSDA mode for NR+NR, where the first cell 315*a* (as well as the first SIM 305*a* and the first subscription) uses an NR RAT and the second cell 315*b* (as well as the second SIM 305*b* and the second subscription) also uses the NR RAT. However, the UE 120 may not be capable of operating in a DSDA mode for NR+LTE, where the first cell 315*a* (as well as the first SIM 305*a* and the first subscription) uses an NR RAT and the second cell 315*b* (as well as the second SIM 305*b* and the second subscription) uses an LTE RAT (or vice versa). In some aspects, the UE 120 may not be capable of operating in the DSDA mode for the second combination of RATs (e.g., NR+LTE), but may be capable of operating in a DSDS mode for the second combination of RATs. This UE design reduces design costs as compared to enabling the UE 120 to operate using the DSDA mode for the second combination of RATs.

In some aspects, the UE 120 communicates using the first SIM 305*a* and/or the second SIM 305*b* using resources allocated to the UE 120 by the base station 110. For example, the base station 110 may transmit a grant, such as a downlink grant or an uplink grant, indicating a resource allocation (e.g., a time-domain resource allocation (TDRA)) for a data channel (e.g., a downlink data channel such as a physical downlink shared channel (PDSCH), an uplink data channel such as a physical uplink shared channel (PUSCH), and/or the like). In some aspects, the UE 120 receives the grant and transmits an acknowledgement to the base station 110 based at least in part on receiving the grant. The grant may include information identifying a TBS associated with the grant and the UE 120 may decode a communication scheduled by the grant based at least in part on the TBS. A TBS indicates a size of a transport block carried by the communication. A transport block is a payload passed to a physical layer of a transmitter. A transport block may carry a payload of a data channel to be transmitted by the transmitter. A receiver (such as the UE or the base station) may need to know the TBS to successfully decode the data received in a data channel.

In some aspects, the UE 120 does not receive a grant for a communication carrying a data channel. For example, the UE 120 may not receive the grant based at least in part on an MSIM gap (e.g., a period of time during which the UE 120 cannot communicate due to the UE 120 switching between the first SIM 305*a* and the second SIM 305*b*), deep fading (e.g., attenuation of a communication channel between the UE 120 and the BS 110), and/or the like. The base station 110 may determine that the UE 120 did not receive the grant (e.g., based at least in part on not receiving an acknowledgement from the UE 120 within a time period) and may retransmit the grant. The UE 120 may receive the retransmission of the grant. However, the retransmission of the grant may not include information identifying the TBS associated with the grant. Because the retransmission does not include the TBS, the UE 120 may be unable to properly decode a transmission scheduled by the grant. Failure to properly decode the transmission scheduled by the grant leads to diminished throughput, violation of quality of service requirements, and increased overhead associated with retransmitting a grant for the transmission and the transmission itself.

Some techniques and apparatuses described herein enable a UE (e.g., UE 120) to determine a TBS for a retransmission of a grant. For example, the UE 120 may receive a grant indicating an MCS that indicates that the grant is a retransmission of an initial communication of a grant. The UE 120 may identify a TBS associated with a prior communication (e.g., a communication that is prior to the initial communication of the grant). The UE 120 may decode a communication scheduled by the grant using the TBS associated with the prior communication. For example, the TBS associated with the prior communication may often be suitable for decoding the communication scheduled by the grant for the retransmission because channel conditions may not significantly change on the time scale associated with the retransmission of the initial communication. In this way, the UE 120 may utilize a TBS associated with a prior communication to decode a communication when an initial grant is missed by the UE 120, which eliminates the need to transmit a grant that explicitly identifies the TBS for the communication for which the initial grant was missed. Thus, throughput is improved, adherence to quality of service requirements is improved, and overhead is reduced.

As indicated above, FIG. 3 is provided as an example. Other examples may differ from what is described with regard to FIG. 3.

Figure 4:
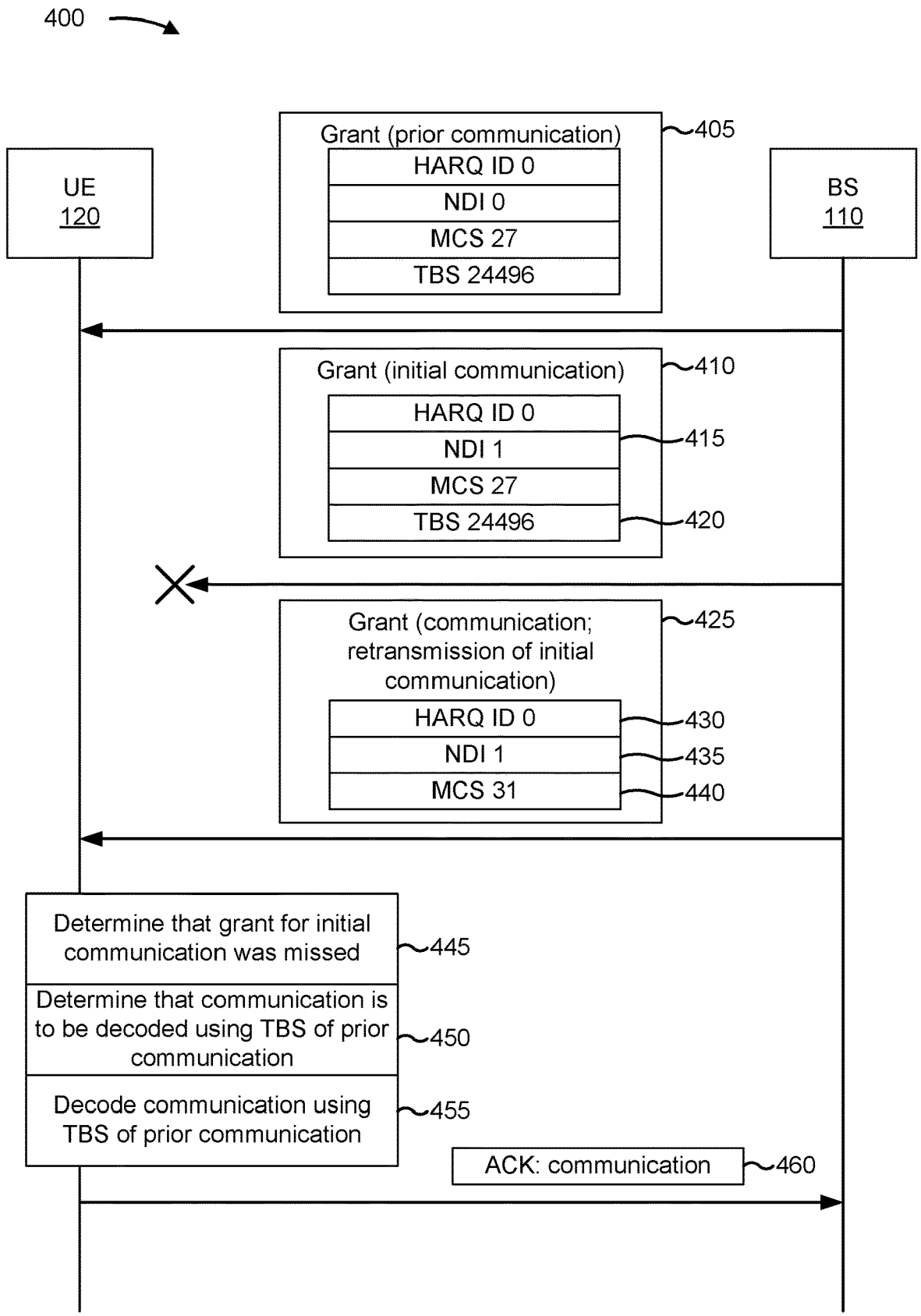
FIGS. 4 and 5 are diagrams illustrating examples associated with transport block size determination for retransmission, in accordance with the present disclosure.

FIG. 4 is a diagram illustrating an example 400 associated with transport block size determination for retransmission, in accordance with the present disclosure. As shown in FIG. 4, a base station 110 and a UE 120 may communicate with one another. In some aspects, over a period of time, the base station 110 may transmit a series of grants to schedule resources for UE 120. For example, as shown in FIG. 4, the base station 110 transmits a first grant 405 to schedule a first set of resources for UE 120 for a prior communication. The base station 110 also transmits a grant for an initial communication (which may be different than the prior communication) and a grant for a retransmission of the initial communication. Each is described below.

In some aspects, the UE 120 parses the first grant 405 to determine an MCS associated with the first grant 405. The MCS may define a quantity of useful bits that can be carried by one symbol or resource element. In some aspects, the value of the MCS field corresponds to an MCS index value associated with an MCS to be utilized by the UE 120 (e.g., an MCS index value of 1 through 27). For example, the MCS may include an index that corresponds to a modulation scheme and a code rate. In some aspects, the first grant 405 includes an MCS field, and a value of the MCS field corresponds to an MCS index value that indicates an MCS associated with the first grant 405. The UE 120 may parse the first grant 405 to determine a value of the MCS field. The UE 120 may determine whether the MCS comprises a special MCS based at least in part on the value of the MCS field. A special MCS indicates that the grant is for a retransmission of an initial communication (as contrasted with a baseline MCS which may indicate that the grant is for an initial communication or that the grant is not for a retransmission). In some aspects, a special MCS is indicated by an MCS index value in a particular range, such as 28 through 31.

In some aspects, the UE 120 determines that the MCS does not comprise a special MCS. For example, as shown in FIG. 4, the UE 120 determines that a value of the MCS field corresponds to an MCS index value of 27. The UE 120 may determine that the MCS index value of 27 is associated with an MCS to be utilized by the UE 120. The UE 120 may determine that the communication of the first grant 405 is an initial communication of the grant based at least in part on the MCS associated with the MCS index value not being a special MCS.

In some aspects, the UE 120 determines a TBS associated with the first grant 405 based at least in part on the first grant 405 being an initial communication of the grant and/or the MCS not comprising a special MCS. In some aspects, the first grant 405 includes a TBS field. A value of the TBS field may indicate a TBS associated with the first grant 405. For example, the value of the TBS field may indicate a quantity of bits of data that can be transmitted per transmission time interval (e.g., 1 ms). The UE 120 may parse the first grant 405 to determine a value of the TBS field and/or a TBS associated with the first grant 405 (e.g., 24496 bits, as shown in FIG. 4).

In some aspects, the UE 120 configures demodulation with a valid descrambler seed and the TBS associated with the first grant 405. The UE 120 may run demodulation to generate a decode result. In some aspects, the UE 120 utilizes an error detection mechanism, such as a cyclic redundancy check (CRC), to determine whether the decode result is properly decoded. For example, the first grant 405 may include a CRC value appended to an end of the TBS. The UE 120 may utilize the CRC to determine whether the decode result is properly decoded based at least in part on the CRC value.

In some aspects, the UE 120 determines that the decode result is properly decoded and sends an acknowledgement to the base station 110. The acknowledgement may indicate that the UE 120 received the first grant 405 and/or that the UE 120 successfully decoded a communication associated with the first grant 405. The base station 110 may receive the acknowledgement and may determine not to retransmit the first grant 405 to the UE 120 based at least in part on receiving the acknowledgement.

As shown in FIG. 4, the base station 110 transmits a second grant 410. In some aspects, the base station 110 transmits the second grant 410 to allocate a second set of resources to the UE 120 for reception of another communication (referred to herein as an initial communication because the grant shown by reference number 425 is for a retransmission of the communication associated with the grant shown by reference number 410). As shown by reference number 415, a value of the NDI field of the second grant 410 is different from a value of the NDI field of the first grant 405 to indicate that the second grant 410 is a new communication with respect to the first grant 405. As shown by reference number 420, the second grant 410 includes a TBS field indicating a TBS associated with the second grant 410.

As indicated in FIG. 4, the UE 120 fails to receive and/or discards the second grant 410. For example, the UE 120 may fail to receive and/or discard the second grant 410 based at least in part on an MSIM gap experienced by the UE 120, deep fading, and/or the like. The base station 110 may determine that an acknowledgement, from the UE 120, was not received prior to an expiration of a time period associated with a retransmission of the second grant 410. For example, the UE 120 may not transmit an acknowledgement to the base station 110 based at least in part on the UE 120 failing to receive the second grant 410.

As shown in FIG. 4, the base station 110 may transmit a grant 425 (referred to herein as a grant for a retransmission) to the UE 120 based at least in part on the base station 110 not receiving an acknowledgement from the UE 120 prior to expiration of the time period associated with a retransmission of the second grant 410. The UE 120 may receive the grant 425 and may parse the grant 425 to determine an MCS associated with the grant 425. The UE 120 may determine that the MCS associated with the grant 425 is a special MCS. For example, the UE 120 may parse the grant 425 to determine a value of an MCS field included in the grant 425 (e.g., 31, as shown in FIG. 4) and may determine that the value of the MCS field corresponds to an MCS index value associated with a special MCS. The UE 120 may determine that the grant 425 is a retransmission of an initial grant based at least in part on the MCS being a special MCS.

The UE 120 may determine whether a new data indicator (NDI) field included in the grant 425 (e.g., 1, as shown by reference number 435) is toggled (e.g., a value of the NDI field is switched between a first value (e.g., 0) and a second value (e.g., 1)) with respect to an NDI of a previous communication received by the UE 120. For example, the UE 120 may identify the first grant 405 as a previous communication received by the UE 120 based at least in part on the NDI field, as described below.

The UE 120 may compare a value of the NDI field of the grant 425 with a value of an NDI field of the first grant 405. The UE 120 may determine that the value of the NDI field of the grant 425 is toggled with respect to the value of the NDI field of the first grant 405. The UE 120 may determine that the grant 425 is a retransmission of a new grant (other than the grant 405) based at least in part on the MCS corresponding to the special MCS and/or the value of the NDI field of the grant 425 being toggled with respect to the value of the NDI field of the first grant 405. As shown by reference number 445, the UE 120 may determine that the grant for the initial communication (e.g., second grant 410) was missed based at least in part on determining that the grant 425 is a retransmission of a new grant, the MCS corresponding to the special MCS, and/or the value of the NDI field of the grant 425 being toggled with respect to the value of the NDI field of the first grant 405.

In some aspects, as shown, the grant 425 may not indicate a TBS associated with the retransmission. This may provide overhead reduction relative to indicating a TBS in every grant, on an assumption that the TBS is likely to be the same between the initial communication and the retransmission. However, since the grant 410 associated with the initial communication was missed, the UE 120 may not know the TBS of the initial communication. The UE 120 may determine that the grant 425 does not include information indicating a TBS associated with the grant 425. For example, the UE 120 may determine that the grant 425 does not include information indicating a TBS associated with the grant 425 based at least in part on the grant 425 being a retransmission of an initial grant (e.g., second grant 410). In other aspects, the UE 120 may perform the operations of example 400 without determining that the grant 420 does not include information indicating a TBS.

As shown by reference number 450, the UE 120 determines that the communication (e.g., scheduled by the grant 425) is to be decoded using the TBS of the prior communication (e.g., the TBS indicated by the first grant 405). In some aspects, the UE 120 determines that the grant 425 is to be decoded using the TBS of the first grant 405 based at least in part on the TBS of the first grant 405 being a valid TBS. In some aspects, the UE 120 determines that the TBS of the first grant 405 is a valid TBS based at least in part on the TBS of the first grant 405 being greater than zero and not being equal to a default TBS (e.g., 5 bytes).

In some aspects, the UE 120 determines whether the TBS of the first grant is valid based at least in part on a hybrid automatic repeat request (HARQ) process identifier (HARQ ID or HARQ process ID) associated with the first grant 405. A HARQ ID may indicate a HARQ process associated with a communication between the base station 110 and the UE 120. For example, the value of the HARQ ID may correspond to a HARQ process identifier associated with a particular HARQ process. The base station 110 and the UE 120 may communicate using the particular HARQ process, which may provide for the retransmission of an unsuccessfully received initial transmission.

In some aspects, the UE 120 determines whether the TBS is valid based at least in part on comparing the HARQ ID associated with the first grant 405 with a HARQ ID associated with the grant 425 (e.g., HARQ ID 0, as shown by reference number 430). The UE 120 may determine that the TBS is valid when the HARQ ID associated with the first grant 405 is the same as the HARQ ID associated with the grant 425.

As shown by reference number 455, the UE 120 decodes the communication using the TBS of the prior communication. For example, the UE 120 may decode the communication using the TBS of the first grant 405 based at least in part on determining that the TBS associated with the first grant 405 is valid.

As shown by reference number 460, the UE 120 transmits an acknowledgement to the base station 110 based at least in part on receiving the grant 425 and/or decoding the grant 425. The acknowledgement may indicate whether UE 120 successfully decoded the grant 425 and the communication scheduled by the grant using the TBS associated with the first grant 405. For example, an acknowledgment (ACK) may indicate that the UE 120 successfully identified the resource allocation of the communication (by decoding the grant) and successfully decoded the communication (using the TBS of the grant 405). A negative ACK (NACK) may indicate that the UE 120 successfully identified the resource allocation of the communication and failed to decode the communication. No ACK or NACK may indicate that the UE 120 failed to receive the grant 425 (and this did not know to transmit an ACK or a NACK).

As indicated above, FIG. 4 is provided as an example. Other examples may differ from what is described with respect to FIG. 4.

Figure 5:
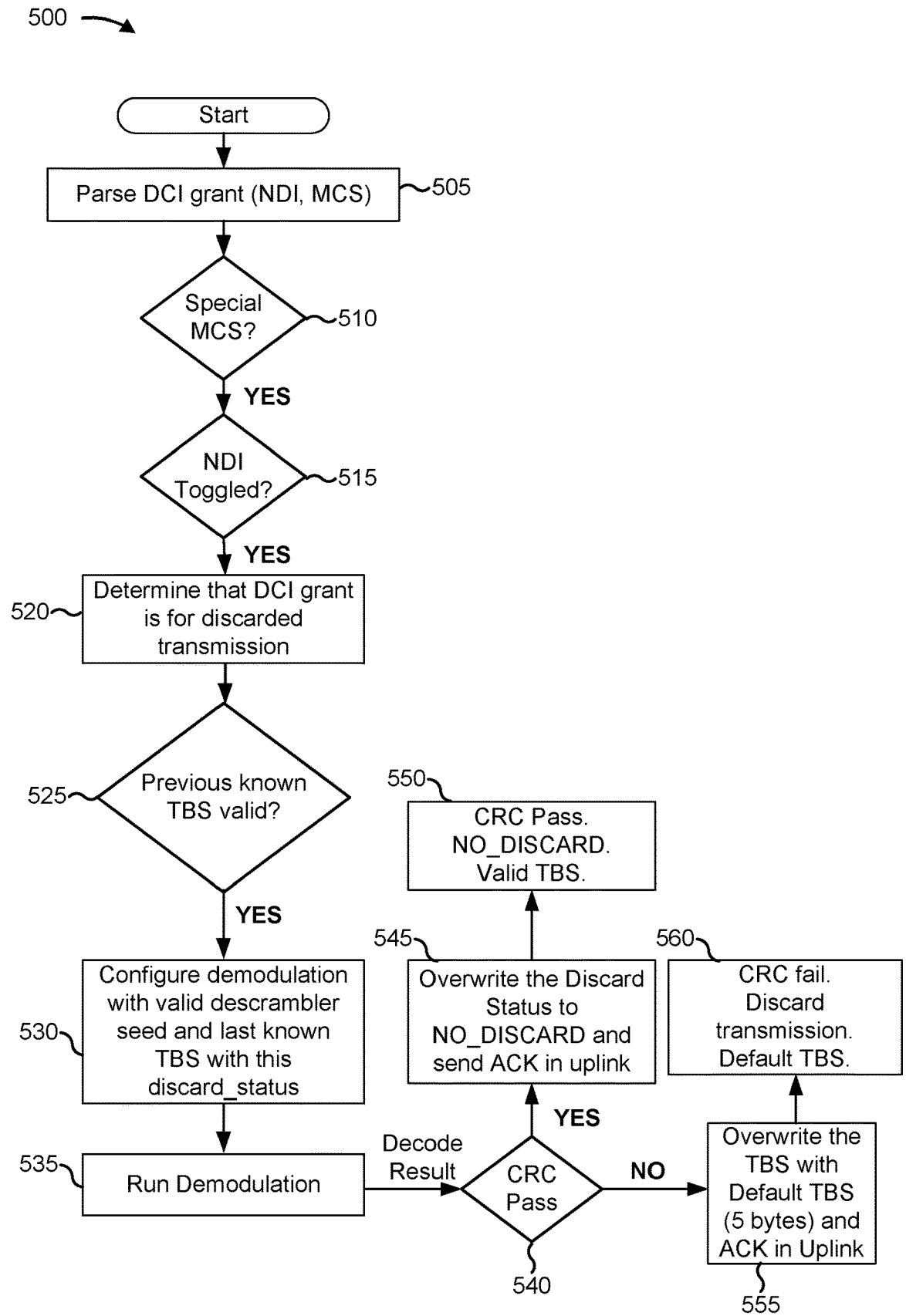

FIG. 5 is a diagram illustrating an example flow diagram of a process 500 associated with transport block size determination for retransmission, in accordance with the present disclosure. In some aspects, one or more process blocks of FIG. 5 may be performed by a UE (e.g., a UE 120). In some aspects, one or more process blocks of FIG. 5 may be performed by another device or a group of devices separate from or including the device, such as a base station (e.g., base station 110).

A UE 120 may receive a downlink control information (DCI) grant from a base station 110. The DCI grant may be associated with an allocation of resources to the UE 120 for communicating with the base station 110.

As shown by reference number 505, the UE 120 parses the DCI grant. The UE 120 may parse the DCI grant to determine an NDI and/or an MCS associated with the DCI grant. In some aspects, the UE 120 parses the DCI grant to determine the NDI and/or the MCS associated with the DCI grant in a manner similar to that described above with respect to FIG. 4.

As shown by reference number 510, the UE 120 determines whether the MCS comprises a special MCS. For example, the DCI grant may include an MCS index value and the UE 120 may determine whether the MCS index value is associated with a special MCS. In some aspects, the UE 120 determines whether the MCS index value is associated with a special MCS in a manner similar to that described above with respect to FIG. 4.

In some aspects, as shown in FIG. 5, the UE 120 determines that the MCS comprises a special MCS (block 510—YES). For example, the UE 120 may determine that the MCS index value included in the DCI grant is associated with a special MCS. In these aspects, as shown by reference number 515, the UE 120 determines whether the NDI is toggled with respect to an NDI of a grant associated with a previous communication. The UE 120 may compare a value of the NDI of the DCI grant with a value of an NDI of the grant associated with a previous communication. For example, if the NDI of the grant associated with the previous communication is 0, a toggled NDI of the DCI grant would be 1.

In some aspects, as shown in FIG. 5, the UE 120 determines that the NDI of the DCI grant is toggled with respect to the NDI of the grant associated with the previous communication. For example, the UE 120 may determine that the NDI of the DCI grant is toggled with respect to the NDI of the grant associated with the previous communication based at least in part on comparing the NDI of the DCI grant and the NDI of the grant associated with the previous communication. In these aspects, as shown by reference number 520, the UE 120 determines that the DCI grant is for a missed and/or discarded transmission (e.g., a missed and/or discarded initial DCI grant) based at least in part on the MCS comprising a special MCS and the NDI being toggled.

In some aspects, the DCI grant does not include information indicating a TBS associated with the DCI grant. The DCI grant may not include the information indicating the TBS associated with the DCI grant based at least in part on the DCI grant being a retransmission of an initial DCI grant.

In some aspects, the UE 120 determines a previous known TBS associated with a prior communication based at least in part on the DCI grant not including the information indicating the TBS associated with the DCI grant. For example, the UE 120 may store or buffer the TBS associated with the prior communication for a length of time (such as a defined length of time, a length of time until an NDI has been toggled and re-toggled, a length of time until a next grant with a TBS and a same HARQ ID is successfully received, or the like). The prior communication may be associated with a most recently received grant that has a toggled NDI relative to the NDI included in the DCI grant.

As shown by reference number 525, the UE 120 determines whether the previous known TBS is valid. The UE 120 may determine whether the previous known TBS is valid based at least in part on the DCI grant being for a discarded transmission. The UE 120 may determine whether the previous known TBS is valid based at least in part on a HARQ ID included in the most recently received grant that has a toggled NDI relative to the NDI included in the DCI grant. In some aspects, the UE 120 determines whether the previous known TBS is valid based at least in part on comparing the HARQ ID included in the most recently received grant that has a toggled NDI relative to the NDI included in the DCI grant with a HARQ ID included in the DCI grant. The UE 120 may determine that the previous known TBS is valid when the HARQ ID included in the most recently received grant that has a toggled NDI relative to the NDI included in the DCI grant is the same as the HARQ ID included in the DCI grant.

In some aspects, the UE 120 determines whether the TBS is valid based at least in part on a value of the TBS. The UE 120 may determine whether a value of the previous known TBS is greater than zero and/or whether the value of the previous known TBS corresponds to a default TBS (e.g., 5 bytes). The UE 120 may determine that the previous known TBS is valid when the value of the previous known TBS is greater than zero and the value of the TBS does not correspond to the default TBS.

In some aspects, as shown in FIG. 5, the UE 120 determines that the previous known TBS is valid. In these aspects, as shown by reference number 530, the UE 120 configures demodulation with a valid descrambler seed and a last known TBS with a discard status (e.g., the previous known TBS included in the most recently received grant that has a toggled NDI relative to the NDI included in the DCI grant). As shown by reference number 535, the UE 120 runs demodulation to generate a decode result.

As shown by reference number 540, the UE 120 determines whether the CRC for the decode result passes. In some aspects, the UE 120 determines that the CRC passes (block 540—YES). In these aspects, as shown by reference number 545, the UE 120 overwrites the discard status of the previous known TBS to a "no discard" status (e.g., a status indicating that the previous known TBS is not to be discarded, that the previous known TBS is to be utilized to decode a communication associated with the DCI grant, and/or that the previous known TBS is valid, among other examples) and transmits an acknowledgement to the base station 110 via the uplink. As indicated by reference number 550, the UE 120 utilizes the previous known TBS to decode communications scheduled by the DCI grant, and determines that decoding is successful based at least in part on the CRC passing. Thus, the UE 120 may decode the communication scheduled by the DCI grant based at least in part on the DCI grant including the MCS and/or the NDI indicating that the DCI grant is for a retransmission of a missed and/or discarded communication (e.g., a missed and/or discarded initial DCI grant) and using the TBS of the previous communication.

In some aspects, the UE 120 determines that the CRC does not pass (block 540—NO). For example, the UE 120 may fail to decode the communication scheduled by the DCI grant. In these aspects, as shown by reference number 555, the UE 120 overwrites the TBS with a default TBS (e.g., 5 bytes) and transmits an acknowledgement to the base station 110 via an uplink. The acknowledgment may indicate that the BS 110 should not transmit another grant associated with the communication that the UE 120 failed to decode. In some aspects, the acknowledgement may include information indicating that the UE 120 received the DCI grant and/or that the UE 120 was unable to successfully decode communications associated with the DCI grant. As shown by reference number 560, the UE 120 may discard the DCI grant and/or set the TBS to the default TBS based at least in part on the failure to decode the communication.

As indicated above, FIG. 5 is provided as an example. Other examples may differ from what is described with respect to FIG. 5. For example, the UE 120 identify another previous known TBS associated with a communication prior to the prior communication based at least in part on the failure of the CRC. The UE 120 may attempt to successfully decode communications associated with the DCI grant based at least in part on the other previous known TBS, in a manner similar to that described above.

Figure 6:
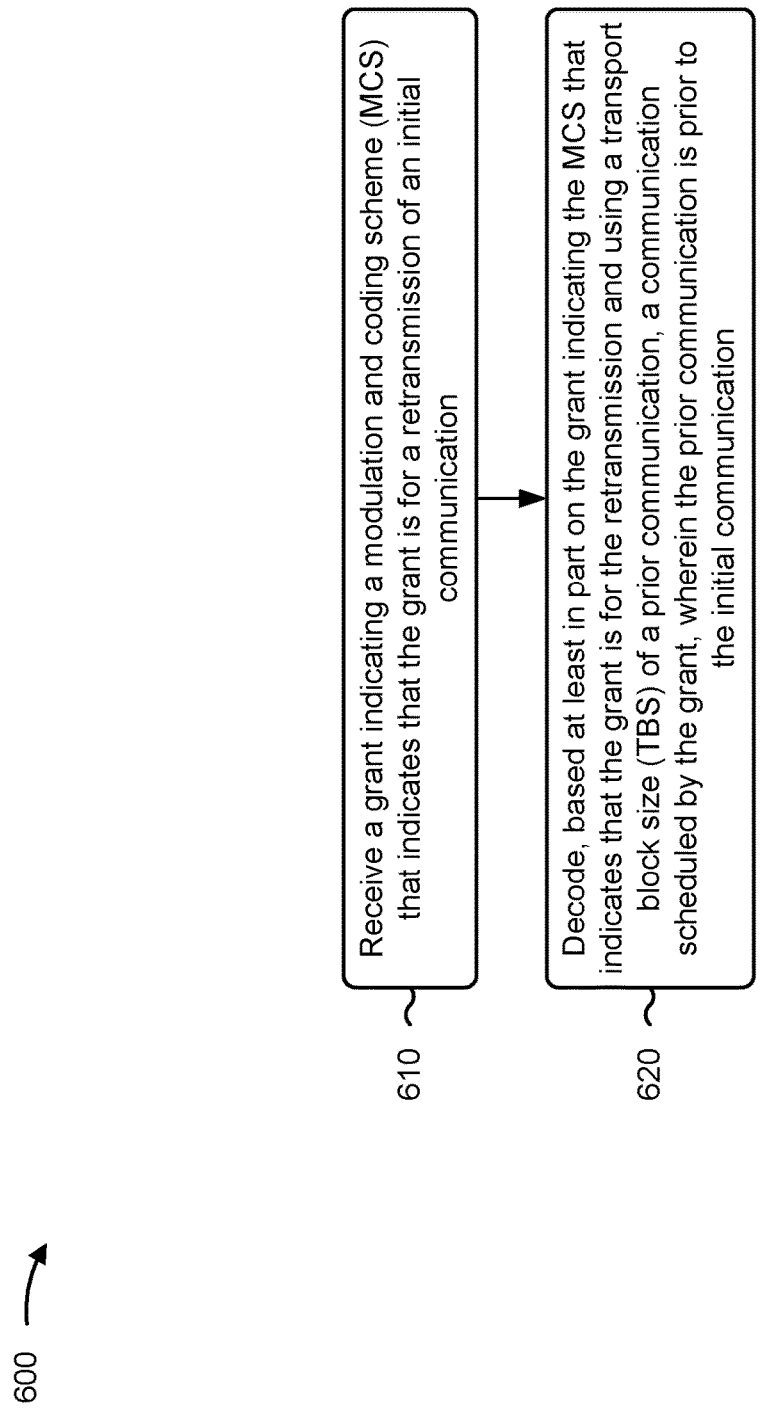
FIG. 6 is a diagram illustrating an example process associated with transport block size determination for retransmission, in accordance with the present disclosure.

FIG. 6 is a diagram illustrating an example process 600 performed, for example, by a UE, in accordance with the present disclosure. Example process 600 is an example where the UE (e.g., UE 120) performs operations associated with transport block size determination for retransmission.

As shown in FIG. 6, in some aspects, process 600 may include receiving a grant indicating an MCS that indicates that the grant is for a retransmission of an initial communication (block 610). For example, the UE (e.g., using reception component 702, depicted in FIG. 7) may receive a grant indicating an MCS that indicates that the grant is for a retransmission of an initial communication, as described above. For example, the grant may be a grant 425, and the initial communication may be associated with a missed grant such as grant 410.

As further shown in FIG. 6, in some aspects, process 600 may include decoding, based at least in part on the grant indicating the MCS that indicates that the grant is for the retransmission and using a TBS of a prior communication, a communication scheduled by the grant, wherein the prior communication is prior to the initial communication (block 620). For example, the UE (e.g., using decoder component 708, depicted in FIG. 7) may decode, based at least in part on the grant indicating the MCS that indicates that the grant is for the retransmission and using a TBS of a prior communication, a communication scheduled by the grant, wherein the prior communication is prior to the initial communication, as described above. For example, the prior communication may be scheduled by a grant such as grant 405.

Process 600 may include additional aspects, such as any single aspect or any combination of aspects described below and/or in connection with one or more other processes described elsewhere herein.

In a first aspect, process 600 includes determining that a grant for the prior communication was missed based at least in part on a new data indicator of the grant being toggled relative to a new data indicator of a grant for the prior communication and the MCS indicating that the grant is for the retransmission.

In a second aspect, alone or in combination with the first aspect, decoding the communication using the TBS of the prior communication is based at least in part on a new data indicator of the grant for the retransmission being toggled relative to a new data indicator of the grant for the prior communication.

In a third aspect, alone or in combination with one or more of the first and second aspects, the prior communication is associated with a most recently received grant that has a toggled new data indicator relative to the grant for the retransmission.

In a fourth aspect, alone or in combination with one or more of the first through third aspects, the grant does not indicate a TBS for the retransmission of the initial communication.

In a fifth aspect, alone or in combination with one or more of the first through fourth aspects, process 600 includes determining that the communication scheduled by the grant is to be decoded using the TBS of the prior communication based at least in part on a new data indicator of the grant being toggled relative to a new data indicator of a grant for the prior communication, the MCS indicating that the grant is for the retransmission, and the TBS of the prior communication being a valid TBS.

In a sixth aspect, alone or in combination with one or more of the first through fifth aspects, determining that the communication scheduled by the grant is to be decoded using the TBS of the prior communication is further based at least in part on the communication scheduled by the grant and the prior communication having a same HARQ process identifier.

In a seventh aspect, alone or in combination with one or more of the first through sixth aspects, process 600 includes transmitting an acknowledgment for the retransmission based at least in part on successfully decoding the communication scheduled by the grant.

In an eighth aspect, alone or in combination with one or more of the first through seventh aspects, process 600 includes transmitting an acknowledgment for the retransmission, indicating an invalid TBS, based at least in part on failing to decode the communication scheduled by the grant.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
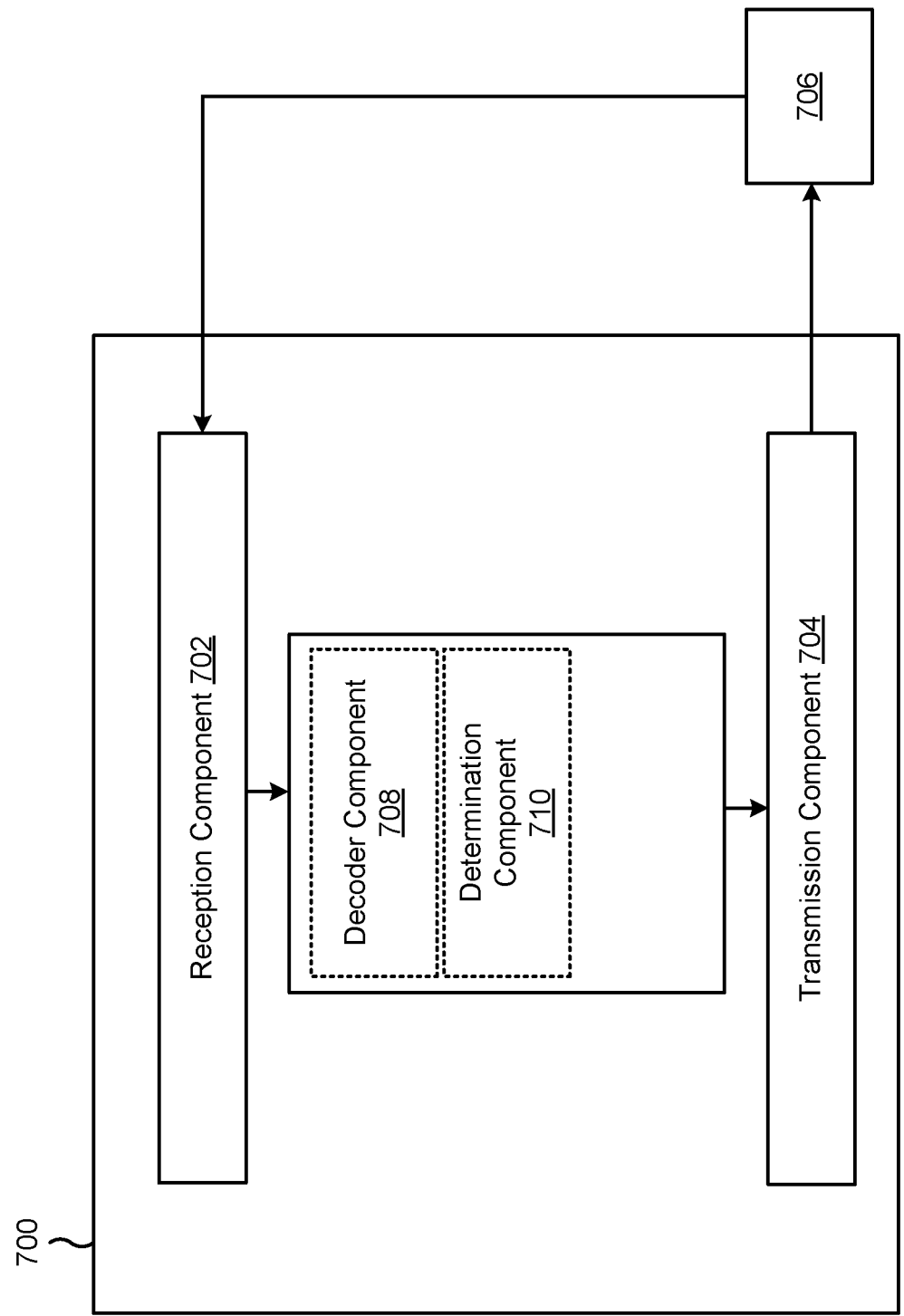
FIG. 7 is a block diagram of an example apparatus for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a decoder component 708 or a determination component 710, among other examples.

In some aspects, the apparatus 700 may be configured to perform one or more operations described herein in connection with FIGS. 4-5. Additionally, or alternatively, the apparatus 700 may be configured to perform one or more processes described herein, such as process 500 of FIG. 5, process 600 of FIG. 6, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The reception component 702 may receive a grant indicating an MCS that indicates that the grant is for a retransmission of an initial communication. The decoder component 708 may decode, based at least in part on the grant indicating the MCS that indicates that the grant is for the retransmission and using a TBS of a prior communication, a communication scheduled by the grant. The prior communication may be received prior to the initial communication.

The determination component 710 may determine that a grant for the prior communication was missed based at least in part on a new data indicator of the grant being toggled relative to a new data indicator of a grant for the prior communication and the MCS indicating that the grant is for the retransmission.

The determination component 710 may determine that the communication scheduled by the grant is to be decoded using the TBS of the prior communication based at least in part on a new data indicator of the grant being toggled relative to a new data indicator of a grant for the prior communication, the MCS indicating that the grant is for the retransmission, and the TBS of the prior communication being a valid TBS.

The transmission component 704 may transmit an acknowledgment for the retransmission based at least in part on successfully decoding the communication scheduled by the grant.

The transmission component 704 may transmit an acknowledgment for the retransmission, indicating an invalid TBS, based at least in part on failing to decode the communication scheduled by the grant.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising receiving a grant indicating a modulation and coding scheme (MCS) that indicates that the grant is for a retransmission of an initial communication; and decoding, based at least in part on the grant indicating the MCS that indicates that the grant is for the retransmission and using a transport block size (TBS) of a prior communication, a communication scheduled by the grant, wherein the prior communication is prior to the initial communication.

Aspect 2: The method of Aspect 1, further comprising: determining that a grant for the prior communication was missed based at least in part on a new data indicator of the grant being toggled relative to a new data indicator of a grant for the prior communication and the MCS indicating that the grant is for the retransmission.

Aspect 3: The method of any of Aspects 1 through 2, wherein decoding the communication using the TBS of the prior communication is based at least in part on a new data indicator of the grant being toggled relative to a new data indicator of a grant for the prior communication.

Aspect 4: The method of any of Aspects 1 through 3, wherein the prior communication is associated with a most recently received grant that has a toggled new data indicator relative to the grant for the retransmission.

Aspect 5: The method of any of Aspects 1 through 4, wherein the grant does not indicate a TBS for the retransmission of the initial communication.

Aspect 6: The method of any of Aspects 1 through 5, further comprising: determining that the communication scheduled by the grant is to be decoded using the TBS of the prior communication based at least in part on: a new data indicator of the grant being toggled relative to a new data indicator of a grant for the prior communication, the MCS indicating that the grant is for the retransmission, and the TBS of the prior communication being a valid TBS.

Aspect 7: The method of any of Aspects 1 through 6, wherein determining that the communication scheduled by the grant is to be decoded using the TBS of the prior communication is further based at least in part on the communication scheduled by the grant and the prior communication having a same hybrid automatic repeat request (HARQ) process identifier.

Aspect 8: The method of any of Aspects 1 through 7, further comprising: transmitting an acknowledgment for the retransmission based at least in part on successfully decoding the communication scheduled by the grant.

Aspect 9: The method of any of Aspects 1 through 8, further comprising: transmitting an acknowledgment for the retransmission, indicating an invalid TBS, based at least in part on failing to decode the communication scheduled by the grant.

Aspect 10: An apparatus for wireless communication at a device, comprising a processor; memory coupled with the processor; and instructions stored in the memory and executable by the processor to cause the apparatus to perform the method of one or more Aspects of Aspects 1 through 9.

Aspect 11: A device for wireless communication, comprising a memory and one or more processors coupled to the memory, the memory and the one or more processors configured to perform the method of one or more Aspects of Aspects 1 through 9.

Aspect 12: An apparatus for wireless communication, comprising at least one means for performing the method of one or more Aspects of Aspects 1 through 9.

Aspect 13: A non-transitory computer-readable medium storing code for wireless communication, the code comprising instructions executable by a processor to perform the method of one or more Aspects of Aspects 1 through 9.

Aspect 14: A non-transitory computer-readable medium storing a set of instructions for wireless communication, the set of instructions comprising one or more instructions that, when executed by one or more processors of a device, cause the device to perform the method of one or more Aspects of Aspects 1 through 9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
 a memory; and
 one or more processors, coupled to the memory, configured to:
  receive a downlink grant indicating a modulation and coding scheme (MCS) that indicates that the downlink grant is for a retransmission of an initial communication; and
  decode, using a transport block size (TBS) of a prior communication and based at least in part on the downlink grant indicating the MCS that indicates that the downlink grant is for the retransmission, a communication scheduled by the downlink grant, wherein the prior communication is prior to the initial communication.

2. The UE of claim 1, wherein the one or more processors are further configured to:
 determine that a downlink grant for the prior communication was missed based at least in part on a new data indicator of the downlink grant for the retransmission being toggled relative to a new data indicator of the downlink grant for the prior communication and the MCS indicating that the downlink grant for the retransmission is for the retransmission.

3. The UE of claim 1, wherein decoding the communication using the TBS of the prior communication is based at least in part on a new data indicator of the downlink grant being toggled relative to a new data indicator of a downlink grant for the prior communication.

4. The UE of claim 1, wherein the prior communication is associated with a most recently received downlink grant that has a toggled new data indicator relative to the downlink grant for the retransmission.

5. The UE of claim 1, wherein the downlink grant does not indicate a TBS for the retransmission of the initial communication.

6. The UE of claim 1, wherein the one or more processors are further configured to:
 determine that the communication scheduled by the downlink grant is to be decoded using the TBS of the prior communication based at least in part on:
  a new data indicator of the downlink grant being toggled relative to a new data indicator of a downlink grant for the prior communication,
  the MCS indicating that the downlink grant for the retransmission is for the retransmission, and
  the TBS of the prior communication being a valid TBS.

7. The UE of claim 6, wherein determining that the communication scheduled by the downlink grant is to be decoded using the TBS of the prior communication is further based at least in part on the communication scheduled by the downlink grant and the prior communication having a same hybrid automatic repeat request (HARQ) process identifier.

8. The UE of claim 1, wherein the one or more processors are further configured to:
 transmit an acknowledgment for the retransmission based at least in part on successfully decoding the communication scheduled by the downlink grant.

9. The UE of claim 1, wherein the one or more processors are further configured to:
 transmit an acknowledgment for the retransmission, indicating an invalid TBS, based at least in part on failing to decode the communication scheduled by the downlink grant.

10. A method of wireless communication performed by a user equipment (UE), comprising:
 receiving a downlink grant indicating a modulation and coding scheme (MCS) that indicates that the downlink grant is for a retransmission of an initial communication; and
 decoding, using a transport block size (TBS) of a prior communication and based at least in part on the downlink grant indicating the MCS that indicates that the downlink grant is for the retransmission, a communication scheduled by the downlink grant, wherein the prior communication is prior to the initial communication.

11. The method of claim 10, further comprising:
 determining that a downlink grant for the prior communication was missed based at least in part on a new data indicator of the downlink grant for the retransmission being toggled relative to a new data indicator of the downlink grant for the prior communication and the MCS indicating that the downlink grant for the retransmission is for the retransmission.

12. The method of claim 10, wherein decoding the communication using the TBS of the prior communication is based at least in part on a new data indicator of the downlink grant being toggled relative to a new data indicator of a downlink grant for the prior communication.

13. The method of claim 10, wherein the prior communication is associated with a most recently received downlink grant that has a toggled new data indicator relative to the downlink grant for the retransmission.

14. The method of claim 10, wherein the downlink grant does not indicate a TBS for the retransmission of the initial communication.

15. The method of claim 10, further comprising:
 determining that the communication scheduled by the downlink grant is to be decoded using the TBS of the prior communication based at least in part on:
  a new data indicator of the downlink grant being toggled relative to a new data indicator of a downlink grant for the prior communication,
  the MCS indicating that the downlink grant for the retransmission is for the retransmission, and
  the TBS of the prior communication being a valid TBS.

16. The method of claim 15, wherein determining that the communication scheduled by the downlink grant is to be decoded using the TBS of the prior communication is further based at least in part on the communication scheduled by the downlink grant and the prior communication having a same hybrid automatic repeat request (HARQ) process identifier.

17. The method of claim 10, further comprising:
transmitting an acknowledgment for the retransmission based at least in part on successfully decoding the communication scheduled by the downlink grant.

18. The method of claim 10, further comprising:
transmitting an acknowledgment for the retransmission, indicating an invalid TBS, based at least in part on failing to decode the communication scheduled by the downlink grant.

19. A non-transitory computer-readable medium storing a set of instructions for wireless communication, the set of instructions comprising:
one or more instructions that, when executed by one or more processors of a user equipment (UE), cause the UE to:
receive a downlink grant indicating a modulation and coding scheme (MCS) that indicates that the downlink grant is for a retransmission of an initial communication; and
decode, using a transport block size (TBS) of a prior communication and based at least in part on the downlink grant indicating the MCS that indicates that the downlink grant is for the retransmission, a communication scheduled by the downlink grant, wherein the prior communication is prior to the initial communication.

20. The non-transitory computer-readable medium of claim 19, wherein the one or more instructions further cause the UE to:
determine that a downlink grant for the prior communication was missed based at least in part on a new data indicator of the downlink grant for the retransmission being toggled relative to a new data indicator of the downlink grant for the prior communication and the MCS indicating that the downlink grant for the retransmission is for the retransmission.

21. The non-transitory computer-readable medium of claim 19, wherein decoding the communication using the TBS of the prior communication is based at least in part on a new data indicator of the downlink grant being toggled relative to a new data indicator of a downlink grant for the prior communication.

22. The non-transitory computer-readable medium of claim 19, wherein the prior communication is associated with a most recently received downlink grant that has a toggled new data indicator relative to the downlink grant for the retransmission.

23. The non-transitory computer-readable medium of claim 19, wherein the downlink grant does not indicate a TBS for the retransmission of the initial communication.

24. The non-transitory computer-readable medium of claim 19, wherein the one or more instructions further cause the UE to:
determine that the communication scheduled by the downlink grant is to be decoded using the TBS of the prior communication based at least in part on:
a new data indicator of the downlink grant being toggled relative to a new data indicator of a downlink grant for the prior communication,
the MCS indicating that the downlink grant for the retransmission is for the retransmission, and
the TBS of the prior communication being a valid TBS.

25. The non-transitory computer-readable medium of claim 24, wherein determining that the communication scheduled by the downlink grant is to be decoded using the TBS of the prior communication is further based at least in part on the communication scheduled by the downlink grant and the prior communication having a same hybrid automatic repeat request (HARQ) process identifier.

26. The non-transitory computer-readable medium of claim 19, wherein the one or more instructions further cause the UE to:
transmit an acknowledgment for the retransmission based at least in part on successfully decoding the communication scheduled by the downlink grant.

27. The non-transitory computer-readable medium of claim 19, wherein the one or more instructions further cause the UE to:
transmit an acknowledgment for the retransmission, indicating an invalid TBS, based at least in part on failing to decode the communication scheduled by the downlink grant.

28. An apparatus for wireless communication, comprising:
means for receiving a downlink grant indicating a modulation and coding scheme (MCS) that indicates that the downlink grant is for a retransmission of an initial communication; and
means for decoding, using a transport block size (TBS) of a prior communication and based at least in part on the downlink grant indicating the MCS that indicates that the downlink grant is for the retransmission, a communication scheduled by the downlink grant, wherein the prior communication is prior to the initial communication.

29. The apparatus of claim 28, further comprising:
means for determining that a downlink grant for the prior communication was missed based at least in part on a new data indicator of the downlink grant for the retransmission being toggled relative to a new data indicator of the downlink grant for the prior communication and the MCS indicating that the downlink grant for the retransmission is for the retransmission.

30. The apparatus of claim 28, wherein decoding the communication using the TBS of the prior communication is based at least in part on a new data indicator of the downlink grant being toggled relative to a new data indicator of a downlink grant for the prior communication.

\* \* \* \* \*